United States Patent [19]
Dyer

[11] 3,718,649
[45] Feb. 27, 1973

[54] PROCESS FOR THIOURACIL PRODUCTION

[75] Inventor: Gerald T. Dyer, Weston, Mass.

[73] Assignee: Polaroid Corporation, Cambridge, Mass.

[22] Filed: Oct. 5, 1970

[21] Appl. No.: 78,232

Related U.S. Application Data

[63] Continuation of Ser. No. 740,105, June 26, 1968, abandoned.

[52] U.S. Cl.......260/251 R, 260/256.4 C, 260/484 R
[51] Int. Cl. ..............................................C07d 51/32
[58] Field of Search ....................260/251 R, 256.4 C

[56] References Cited

UNITED STATES PATENTS 2,417,318   3/1947   Northey ..............................260/251

Primary Examiner—Alex Mazel
Assistant Examiner—R. V. Rush
Attorney—Brown and Mikulka and Alvin Isaacs

[57] ABSTRACT

Novel method for preparing 4-hydroxy pyrimidine and 2-substituted analogues thereof such as thiouracil. Essentially the method involves the reaction of an ester of acetic acid with an ester of formic acid and an alkali metal alcoholate in the presence of an inert nitrogen atmosphere. The reaction mixture produced by the foregoing contains the corresponding alkali metal formylacetic ester which is reacted with thiourea to produce thiouracil.

8 Claims, No Drawings

PROCESS FOR THIOURACIL PRODUCTION

CROSS REFERENCE TO RELATED APPLICATION

This application is a continuation application of Ser. No. 740,105, filed June 26, 1968 and now abandoned.

BACKGROUND OF THE INVENTION

U.S. Pat. No. 2,417,318 is directed to the preparation of such compounds by what may be regarded as a two step process: (1) reacting an ester of acetic acid with an ester of formic acid and an alkali metal alcoholate under superatmospheric pressure in the presence of an atmosphere of carbon monoxide to provide a crude reaction mixture containing an alkali metal formylacetic ester which is (2) then reacted, without isolation, with a compound of the formula:

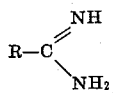

wherein R is hydrogen, lower alkyl, e.g., methyl, amino, cyanamino or mercapto, to form the desired compound.

The patented process, which is directed to an improved process for obtaining these compounds in greater yields, teaches that the first step described above should be carried out in the presence of a carbon monoxide atmosphere and under superatmospheric pressure on the order of 130–250 psi.

The present invention is directed to an improvement over the procedures described and claimed in this patent, which improvement provides certain significant advantages.

SUMMARY OF THE INVENTION

According to the present invention, at least the first step of the process is performed in an atmosphere of nitrogen in lieu of the carbon monoxide atmosphere of the reference. This change in the reaction atmosphere provides a significant increase in yield over the patented process, at least in the synthesis of thiouracil, and in general provides certain other advantages, chief of which are the use of a gas (nitrogen) which is less expensive and, unlike carbon monoxide, is nonflammable, and moreover, permits the reaction to be carried out at lower pressures, e.g., 50–80 psi, in standard vessels, whereas the greater pressures employed in the patented process require the use of special vessels. The increased economy and safety provided by the present invention will therefore be readily appreciated, particularly if one contemplates large scale production of these compounds.

DESCRIPTION OF THE PREFERRED EMBODIMENT

The present invention is particularly directed to the preparation of thiouracil in increased yield, e.g., in yields on the order of 50 percent greater than those obtainable by the patented process.

As was mentioned previously, this invention is directed to novel procedures for preparing 4-hydroxy pyrimidines.

A primary object, therefore, is to provide novel processes of the foregoing description.

Another object is to provide a novel method for preparing alkali metal formylacetic esters, which in turn may be employed, without isolation, as intermediates in the preparation of 4-hydroxy pyrimidines.

Still another object is to provide a novel two step procedure for preparing thiouracil in increased yields.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

As was mentioned previously, this invention is directed to an improved process wherein an ester of acetic acid is reacted with an ester of formic acid and an alkali metal alcoholate under superatmospheric pressure to provide a reaction mixture containing an alkali metal formylacetic ester which in turn may be reacted, without separation or isolation, with a compound of the formula:

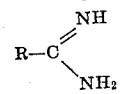

wherein R may be hydrogen, lower alkyl, amino, cyanoamino, or mercapto, to form the corresponding 4-hydroxy pyrimidine. The present invention may be regarded as an improvement over the process described and claimed in U.S. Patent No. 2,417,318, the essence of the present invention being carrying out the first step of the reaction, i.e., formation of the alkali metal formylacetic ester, in the presence of an atmosphere of nitrogen.

To prepare 4-hydroxy pyrimidine and 2-substituted derivatives thereof, e.g., thiouracil, isocytosine, 2-methyl-4-hydroxy-pyrimidine, 2-cyanamino-4-hydroxy-pyrimidine, etc., the starting esters in the first-mentioned step, are methyl formate and ethyl acetate respectively. As will be appreciated by those skilled in the art, homologues of these esters may be employed to prepare other nuclearly substituted derivatives, e.g., 6-alkyl-4-hydroxy-pyrimidines. As examples of such other esters, mention may be made of those disclosed in the aforementioned patent, namely methyl, isopropyl or butyl acetate and ethyl or isopropyl formate. In any event, while the preferred alkali metal alcoholate is sodium methylate, other alkali metal alcoholates may be employed. Such other alcoholates include homologues of sodium methylate such as sodium ethylate and those employing alkali metals other than sodium, for example, potassium, lithium, etc.

The reaction conditions, other than the presence of an atmosphere of nitrogen, are not an essential part of this invention and they will be readily apparent to those skilled in the art. While the first step should be run under superatmospheric pressure, as heretofore noted, the particular pressure employed need not be as great as those disclosed in the aforementioned patent. In general, pressures on the order of 50–80 pounds per square inch are sufficient, as distinguished from the appreciably greater pressures disclosed in the patented process, thereby permitting the reaction to be carried out in standard vessels which could not be employed with the greater pressures. The time and temperatures employed will also be readily apparent. For optimum results, however, the temperature employed in the first step should be maintained so as not to permit a rapid pressure buildup caused by evolvement of gas during the reaction. A rapid evolvement of gas results in a loss of product and hence a lower yield. Since the pressure buildup is directly proportional to the starting temperature, the initial temperature should ideally be maintained near the lower limit at which the reaction will take place, in this case around 20° C. and, if needed, gradually increased in small increments, e.g., 2° or 3° increments, after pressure buildup ceases. The reaction may be regarded as complete when further increases in temperature cause no further pressure buildup. By way of illustration, the first step may be performed by gradually increasing the temperature from about 20° C. to about 60° C., controlling the pressure at about 70 psi, until no pressure buildup is observed.

While the process to which this invention is directed is considered to be a two step process for forming 4-hydroxy pyrimidines, in a sense it may also be regarded as a three step process since the second step forms the alkali metal salt, e.g., the sodium salt, of the desired product. The 4-hydroxy compound is readily formed from the salt by hydrolysis, e.g., reaction with a mineral acid such as concentrated hydrochloric acid, in what may be said to be a third step.

In any event, it will be noted that the intermediate reaction product (or products) need not be isolated, and the reaction steps may be performed in sequence in the same vessel to provide the crude product which may then be isolated in effectively pure form in routine manner.

The following example shows by way of illustration and not be way of limitation the practice of this invention.

EXAMPLE 77.6 g. of methyl formate were introduced into a vessel which had first been partially evacuated and then maintained in an atmosphere of nitrogen at a pressure of about 50 psi. 151.2 g. of ethyl acetate were then introduced and the mixture was cooled, while stirring, to about −10° C. 80.8 g. of sodium methylate were slowly added over a period of about one hour while maintaining the temperature below 10° C. The mixture was then heated slowly to about 60° C. over a five hour period while maintaining an atmosphere of nitrogen at a pressure of about 70 psi. It was then cooled to 15° C., venting the pressure to atmosphere. A slurry of about 75.7 ml. of water, 72.0 g. of thiourea and 21.8 g. of a 50% aqueous sodium hydroxide solution was slowly added to the reaction mixture. [Since an instantaneous exotherm occurs, the slurry was added slowly while cooling with a cooling jacket containing −15° C. glycol so as to maintain the temperature of the mixture below 20° C.] After all of the slurry was introduced, the resulting mixture was stirred for about five hours. Approximately 189 ml. of water were then added and the mixture was first heated to 60° C. and then cooled to about 30° C. About 94.0 g. of concentrated hydrochloric acid were then added to adjust the pH to between 5.0 and 6.0. The mixture containing the resulting crude thiouracil was filtered through a centrifuge and washed with water until the filtrate was clear. The filter cake was recovered and dried in a vacuum dryer at 60° C. to obtain approximately 100 g. of pure thiouracil, a 65 percent yield based upon the starting methyl formate.

Repeated runs of the above procedure afforded similar percentage yields of the theoretical. Conversely, repeated attempts to reproduce Example 5 of the patented process directed to the preparation of thiouracil provided yields on the order of 40 percent of the theoretical, indicating that the present invention provides over a 50 percent increase in yield over the patented process. Allowing for the fact that the attempts to reproduce the patented example might not have been precisely accurate, the present invention still provides a significant increase in yield over the 47 percent of the theoretical stated by the patentee to have been obtained.

As was mentioned earlier, the present invention also permits one to employ lower pressures, to carry out the reaction in standard vessels, and further provides safer operating conditions including the use of the inert nitrogen in lieu of the inflammable carbon monoxide.

While the foregoing example relates to the preparation of thiouracil, since the essence of the invention is directed to the first step which is common to the preparation of the class of 4-hydroxy pyrimidines in general, it will be readily apparent that appropriate substitution of compounds of the disclosed formula for thiourea in the second step will provide the corresponding analogue. Hence, it will be apparent that the invention may be employed in the preparation of 4-hydroxy pyrimidines other than thiouracil.

Since certain changes may be made in the above process without departing from the scope of the invention herein involved, it is intended that all matter contained in the above description shall be interpreted as illustrative and not in a limiting sense.

What is claimed is:
1. A process which comprises the steps of
   a. reacting an ester formed by the reaction of acetic acid and an alkyl alcohol having from one to three carbon atoms, and ester formed by the reaction of formic acid and an alkyl alcohol having from one to four carbon atoms and an alkali metal methylate or an alkali metal ethylate in a nitrogen atmosphere under superatmospheric pressure to produce a strongly alkaline reaction mixture containing the corresponding alkali metal formylacetic ester;
   b. condensing said formylacetic ester without isolation from the reaction mixture with thiourea in the presence of aaustic, alkali; and
   c. hydrolyzing the resulting sodium salt to form thiouracil.

2. A process as defined in claim 1 wherein said first reaction step is carried out under a pressure of from about 50 to about 80 pounds per square inch.

3. A process as defined in claim 1 wherein the temperature during said first-mentioned step is maintained so as not to permit a rapid pressure buildup during said reaction.

4. A process as defined in claim 3 wherein the starting temperature of said first-mentioned reaction is about 20° C. and said temperature is slowly increased in small increments while maintaining a substantially constant pressure until further increases in temperature cause no further increase in pressure.

5. A process which comprises the steps of
   a. reacting ethyl acetate, methyl formate and sodium methylate in a nitrogen atmosphere under superatmospheric pressure to produce a strongly alkaline reaction mixture containing the corresponding alkali metal formylacetic ester;
   b. condensing said formylacetic ester without isolation from the reaction mixture, with thiourea in the presence of caustic alkali and
   c. hydrolyzing the resulting sodium salt to form thiouracil.

6. A process as defined in claim 5 wherein said first reaction step is carried out under a pressure of from about 50 to about 80 pounds per square inch.

7. A process as defined in claim 5 wherein the temperature during step (a) is maintained so as not to permit a rapid pressure buildup during said reaction.

8. A process as defined in claim 7 wherein the starting temperature of step (a) is about 20° C. and said temperature is slowly increased in small increments while maintaining a substantially constant pressure until further increases in temperature cause no further increase in pressure.

* * * * *